United States Patent
Frolov et al.

(10) Patent No.: US 9,541,924 B2
(45) Date of Patent: Jan. 10, 2017

(54) METHODS AND APPARATUS FOR DISTRIBUTED AIRBORNE TRANSPORTATION SYSTEM

(71) Applicant: SUNLIGHT PHOTONICS INC., Edison, NJ (US)

(72) Inventors: Sergey V. Frolov, New Providence, NJ (US); John Peter Moussouris, Palo Alto, CA (US); Michael Cyrus, Castle Rock, CO (US)

(73) Assignee: SUNLIGHT PHOTONICS INC., Edison, NJ (US)

( * ) Notice: Subject to any disclaimer, the term of this patent is extended or adjusted under 35 U.S.C. 154(b) by 0 days.

(21) Appl. No.: 14/737,814

(22) Filed: Jun. 12, 2015

(65) Prior Publication Data

US 2016/0363938 A1     Dec. 15, 2016

(51) Int. Cl.
  *G05D 1/10* (2006.01)
  *G05D 1/00* (2006.01)
  (Continued)

(52) U.S. Cl.
  CPC .......... *G05D 1/104* (2013.01); *B64C 3/56* (2013.01); *B64C 29/0016* (2013.01);
  (Continued)

(58) Field of Classification Search
  CPC ...... G05D 1/104; G05D 1/005; G05D 1/0027; G05D 1/0022; G05D 1/0212; G05D 1/0669; G05D 1/102; B64C 37/02; B64C 3/56; B64C 2201/021; B64C 2201/088; B64C 2201/128; B64C 2201/102; G08G 5/0008; G08G 5/0013; G08G 5/0017; G08G 5/003
  See application file for complete search history.

(56) References Cited

U.S. PATENT DOCUMENTS 2,714,309 A  *  8/1955  Redemske .............. G06G 7/78
                                                      244/3.15
3,573,818 A  *  4/1971  Lennon, Jr. ............ G05D 1/104
                                                      342/29
(Continued)

FOREIGN PATENT DOCUMENTS

GB       2476149 A       6/2011
WO    WO 2008/018857 A2  2/2008

OTHER PUBLICATIONS

Fierro et al, On Controlling Aircraft Formations, Proceedings of the 40th IEEE Conference on Decision and Control, 2001, pp. 1065-1070.*

(Continued)

*Primary Examiner* — Russell Frejd
(74) *Attorney, Agent, or Firm* — Moser Taboada; Alan Taboada (57) ABSTRACT

Embodiments of the present invention provide an alternative distributed airborne transportation system. In some embodiments, a method for distributed airborne transportation includes: providing an airborne vehicle with a wing and a wing span, having capacity to carry one or more of passengers or cargo; landing of the airborne vehicle near one or more of passengers or cargo and loading at least one of passengers or cargo; taking-off and determining a flight direction for the airborne vehicle; locating at least one other airborne vehicle, which has substantially the same flight direction; and joining at least one other airborne vehicle in flight formation and forming a fleet, in which airborne vehicles fly with the same speed and direction and in which adjacent airborne vehicles are separated by distance of less than 100 wing spans.

21 Claims, 6 Drawing Sheets

(51) Int. Cl.
  *G05D 1/02* (2006.01)
  *G05D 1/06* (2006.01)
  *B64C 37/02* (2006.01)
  *B64C 3/56* (2006.01)
  *G08G 5/00* (2006.01)
  *G08G 7/02* (2006.01)
  *B64C 29/00* (2006.01)

(52) U.S. Cl.
  CPC .............. *B64C 37/02* (2013.01); *G05D 1/005* (2013.01); *G05D 1/0022* (2013.01); *G05D 1/0027* (2013.01); *G05D 1/0212* (2013.01); *G05D 1/0669* (2013.01); *G05D 1/102* (2013.01); *G08G 5/0008* (2013.01); *G08G 5/0013* (2013.01); *G08G 7/02* (2013.01); *B64C 2201/021* (2013.01); *B64C 2201/088* (2013.01); *B64C 2201/102* (2013.01); *B64C 2201/128* (2013.01); *G08G 5/003* (2013.01); *G08G 5/0017* (2013.01)

(56) References Cited

U.S. PATENT DOCUMENTS

| | | | | |
|---|---|---|---|---|
| 4,674,710 A * | 6/1987 | Rodriguez | ............. | G05D 1/104 244/3 |
| 6,963,795 B2 * | 11/2005 | Haissig | ................ | G08G 5/0008 342/104 |
| 7,006,032 B2 * | 2/2006 | King | ....................... | G01S 3/023 342/29 |
| 7,793,888 B2 * | 9/2010 | Padan | ..................... | B64D 1/00 244/118.1 |
| 7,975,958 B2 * | 7/2011 | Sommer | ................. | B64C 37/02 244/117 R |
| 8,897,770 B1 * | 11/2014 | Frolov | ............... | H04B 7/18504 244/25 |
| 8,936,212 B1 * | 1/2015 | Fu | .............................. | B64C 3/56 244/12.4 |
| 8,983,455 B1 * | 3/2015 | Frolov | ............... | H04B 7/18504 244/25 |
| 2005/0165516 A1 * | 7/2005 | Haissig | ................ | G08G 5/0008 701/4 |
| 2005/0230563 A1 * | 10/2005 | Corcoran, III | ......... | G05D 1/104 244/175 |
| 2007/0132638 A1 * | 6/2007 | Frazier | .................. | G01S 13/765 342/455 |
| 2008/0296428 A1 | 12/2008 | Reinhardt | | |
| 2012/0048990 A1 * | 3/2012 | Sommer | ................. | B64C 37/02 244/3 |

OTHER PUBLICATIONS

Wang et al, Controllability Properties for Aircraft Formations, 49th IEEE Conference on Decision and Control, Dec. 2010, pp. 2047-2054.*

Kim et al, Development of Multiple Unmanned Aircraft System and Flight Experiment, IEEE, 2015 International Conference on Unmanned Aircraft Systems, Jun. 2015, pp. 551-558.*

Jiang et al, Investigation of Dynamic Characteristic of Forward Swept Folding Wing, Proceeding of the IEEE International Conference on Automation and Logistics, Aug. 2011, pp. 225-228.*

H.P. Thien, M.A. Moelyadi, H. Muhammad, "Effects of Leaders Position and Shape on Aerodynamic Performances of V Flight Formation", Proceedings of the International Conference on Intelligent Unmanned System (ICIUS 2007), Bali, Indonesia, Oct. 24-25, 2007, pp. 43-49.

Annex to Form PCT/ISA/206, Communication Relating to the Results of the Partial International Search mailed Sep. 14, 2016 for International Application No. PCT/US2016/037074.

* cited by examiner

METHODS AND APPARATUS FOR DISTRIBUTED AIRBORNE TRANSPORTATION SYSTEM

FIELD

Embodiments of the present invention generally relate to systems, methods and apparatus for airborne transportation, and in particular to those for enabling massively scalable modular transportation of passengers and cargo based on a self-organizing fleet of airborne vehicles.

BACKGROUND

Modern airborne transportation is primarily based on relatively large size fixed-wing aircraft that can transport relatively large number of passengers and amount of cargo between a limited number of airports, which are areas specially created for take-off and landing of regular aircraft. As a result, such a transportation system is limited in its abilities to remain economical and provide adequate services under increasing demands for faster, better and more reliable performance. Airports represent one of the most apparent bottlenecks in this system. They are expensive to operate for owners and inconvenient to use for customers. Existing airports are being utilized at close to capacity and additional ones are not built fast enough.

Existing airborne transportation systems are in many ways similar to ground-based centralized systems for public and mass transportation, well-known examples of which are ones based on railroad and highway bus transport. Such systems lack the flexibility and convenience of a distributed transportation system.

Therefore, the inventors have provided an improved airborne transportation system, which provides one or more benefits of distributed transportation.

SUMMARY

Embodiments of the present invention provide an alternative distributed airborne transportation system. In some embodiments, a method for distributed airborne transportation includes: providing an airborne vehicle with a wing and a wing span, having capacity to carry one or more of passengers or cargo; landing of the airborne vehicle near one or more of passengers or cargo and loading at least one of passengers or cargo; taking-off and determining a flight direction for the airborne vehicle; locating at least one other airborne vehicle, which has substantially the same flight direction; and joining at least one other airborne vehicle in flight formation and forming a fleet, in which airborne vehicles fly with the same speed and direction and in which adjacent airborne vehicles are separated by distance of less than 100 wing spans.

In some embodiments, a method for distributed airborne transportation within an area on the ground includes: providing an airborne vehicle with a wing and a wing span, having capacity to carry at least one of passengers or cargo; determining and defining possible non-intersecting flight routes in the area; landing of the airborne vehicle and loading at least one of passengers or cargo; taking-off and selecting an appropriate flight route for the airborne vehicle; and merging into the flight route.

In some embodiments, a distributed airborne transportation system, includes: a plurality of airborne vehicles, each having a wing and vertical take-off and landing capabilities; an airborne fleet comprising at least two of the plurality of airborne vehicles flown in flight formation, where the separation between the airborne vehicles within the fleet is less than the average wingspan of the plurality of airborne vehicles in the airborne fleet; and a flight control center with established wireless communication links between the flight control center and the plurality of airborne vehicles.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed.

Embodiments of the present invention provide an alternative distributed airborne transportation system, which can operate without airports. This distributed airborne transportation system is based on a modular distributed transport approach, which uses relatively small-scale airborne vehicles capable of loading and unloading passengers and cargo at the point of a service request (a la taxi service) and of long-range travel using flight formation and other methods. Such a distributed airborne transportation system can offer advantages such as convenience for customers and scalability (i.e., the ability to grow in size and capacity). At the same time, it may be more advantageous than ground-based distributed systems, since it does not require the creation and maintenance of roadways on the ground. Non-limiting examples include providing transport systems and methods based on fixed-wing unmanned airborne vehicles with vertical take-off and landing capabilities.

Figure 1:
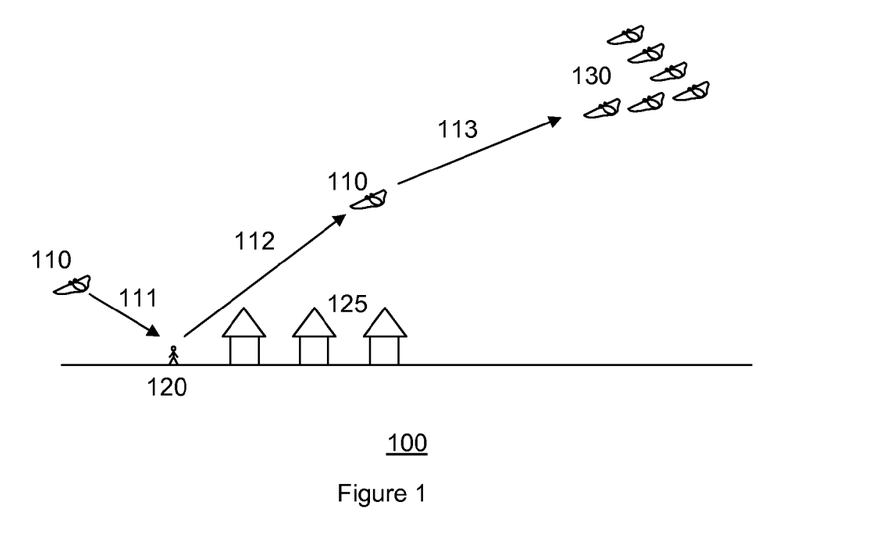
FIG. 1 shows an airborne system for distributed transportation of passengers and cargo in accordance with at least some embodiments of the present invention.

In accordance with embodiments of the present invention, an airborne system is provided for distributed transportation of passengers and cargo as shown in FIG. 1. In a system 100 an airborne vehicle (vehicle 110) may be provided for a customer 120 at an arbitrary location 125. Vehicle 110 has a range of capabilities including, but not limited to: 111—landing at a site near customer location, 112—boarding a customer and taking off, and 113—ascending and reaching cruising speed and altitude. At a cruising altitude, vehicle 110 may join a fleet 130 comprised of similar airborne vehicles to produce a flight formation. Fleet 130 may include vehicles traveling to different destinations, but along the same route in the same general direction.

Flight formation as used herein, means an arrangement of airborne vehicles flying in sufficiently close proximity to each other to impact the flight characteristics of the fleet as a whole. Fleets in flight formation may include two or more airborne vehicles. Flight formation enables more energy efficient flight, while giving the flexibility of entering or leaving the fleet at any time. For example, flight in a V formation can greatly enhance the overall aerodynamic efficiency of the fleet by reducing the drag and thereby increasing the flight range.

Airborne vehicles that may be used in system 100 include helicopters, fixed-wing planes, VTOL (vertical take-off and landing) aircraft, rotorcraft, lighter-than-air airships, hybrid aircraft and others. Some of the methods described in this invention may also be applicable to a wider variety of aircraft options, including regular fixed-wing airplanes. In the latter case, however, the loading and unloading of cargo and passenger may be restricted to special locations and take place at small airports and airfields.

Small-scale aircraft suitable for these methods may utilize different flight control options, such as manual piloting, remote piloting, and automatic piloting. In the case of manual piloting, an on-board pilot is in full control of an aircraft and its maneuvers. In remote piloting, an aircraft is piloted by a person that is not on board of an aircraft via a radio communication link. In automatic piloting, an on-board computer system provides full flight control capabilities, including flight planning, path monitoring, maneuvering, transitioning between different aircraft configurations and so on. Finally, in a hybrid flight control option two or more of these options may be available, for example, so that the same aircraft may be piloted manually, remotely, or automatically at different times. The automatic piloting option is particularly attractive for flight formations, where precise and quick maneuvering is essential.

Cargo sections in these aircraft may take different forms depending on whether passenger transport is involved. Passengers may also be labeled as "Human Cargo" (HC) for generalization purposes. HC transport may occur via specialized containers or HC pods. Such pods may loaded and unloaded onto airborne vehicles in a similar way to regular cargo containers.

Figure 2:
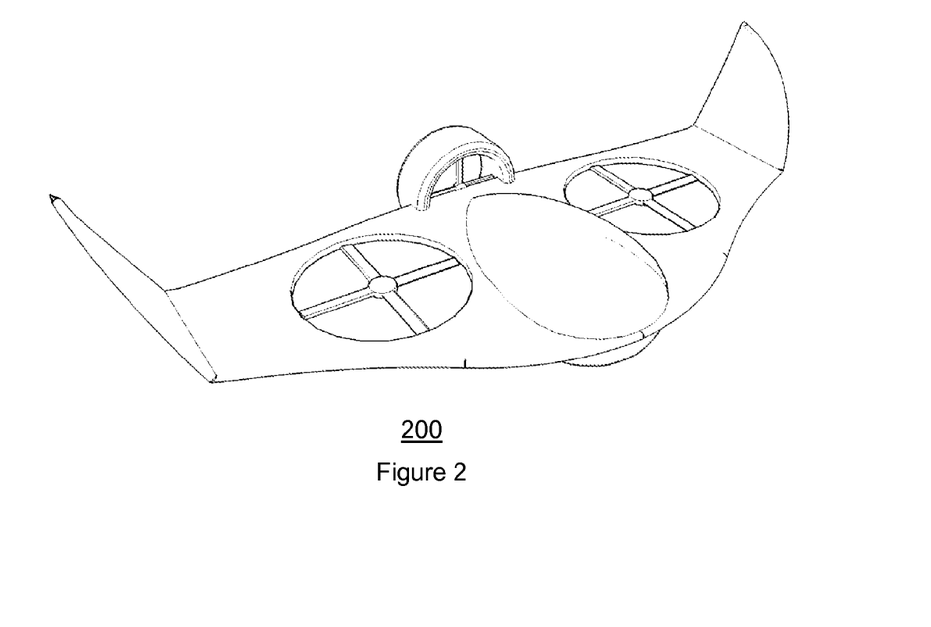
FIG. 2 shows an exemplary fixed-wing aircraft with vertical take-off and landing (VTOL) capabilities in accordance with at least some embodiments of the present invention.
Figure 3:
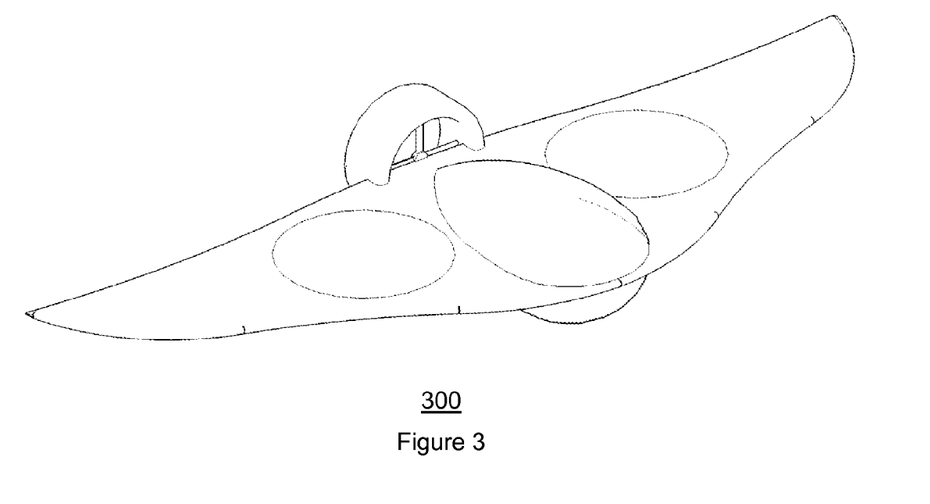
FIG. 3 shows an exemplary fixed-wing aircraft with vertical take-off and landing (VTOL) capabilities having shuttered fan openings in a VTOL vehicle configuration in accordance with at least some embodiments of the present invention.

In accordance with embodiments of the present invention, one of the preferred vehicles for this system is a fixed-wing aircraft with vertical take-off and landing (VTOL) capabilities. It combines the advantages of being able to take-off and land outside of airports and fly at relatively high cruising speeds. FIG. 2 shows, as an example of such an aircraft, a VTOL plane 200. This plane has tailless design using a fuselage with sufficient room to accommodate one or more passengers. The wing has built-in fans for providing a vertical lifting force for take-off and landing. The wing may also fold its tips for minimizing the size of the landing site. After a take-off, another motor with a propeller may provide propulsion to achieve sufficient speed, at which the wing has enough lift and the fans can be turned off. At this point, the fan openings may be shuttered as shown in FIG. 3 in a VTOL vehicle configuration 300.

Figure 4:
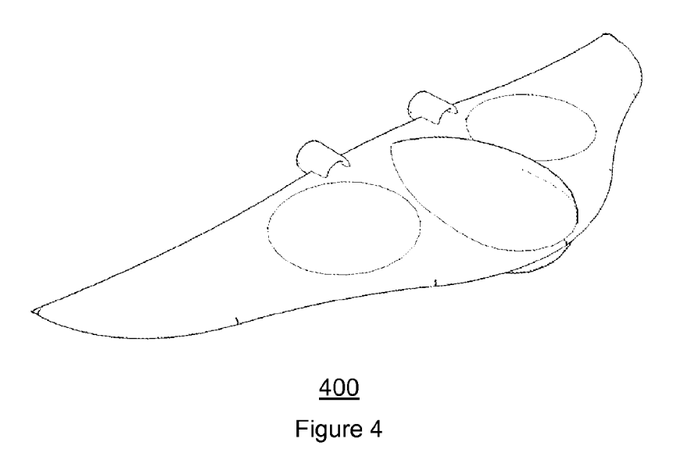
FIG. 4 shows a VTOL design in which the propulsion is provided by two ducted fans in accordance with at least some embodiments of the present invention.

Of course many other VTOL vehicles designs may be possible within the scope of this invention. For example, FIG. 4 shows a VTOL design 400 in which the propulsion is provided by two ducted fans. Instead of fans, gimbaled motors with propellers can be used for both vertical and lateral propulsion. A preferred propulsion mechanism may include an electric motor with a propeller. However, one may use an electrically powered plasma jet engine as an alternative. As a result, cruising speeds, which may be achieved either by individual vehicles or within a fleet, may reach supersonic speeds.

Also, the wing shape may take different forms. In addition, a VTOL design with a tail may be used as an alternative. Folding-wing and/or folding-tail designs are particularly attractive, because it allows VTOL vehicles to land in tighter areas on the ground. A foldable wing is shown as an example in FIG. 2. Wings or some of their parts may be rotating to enable VTOL capabilities, in which for example a motor attached to the wing may be rotated by at least 90 degrees. Alternatively, other sections of the airframe may be rotating, e.g., the fuselage or some of its sections.

Various power systems and their combinations may be used for powering such vehicles, including fossil fuels, electric batteries, fuel cells, solar power, and other renewable power sources. A particularly attractive solution for this application comprises an electrically powered VTOL plane with additional solar photovoltaic (PV) power system, because of its efficiency and low noise. In addition, kinetic energy conversion systems may also be used as alternative energy sources, particularly in emergency situations. A preferred power system may have several redundant power sources, such as electrical batteries, fuel cells, and solar cells.

Figure 5:
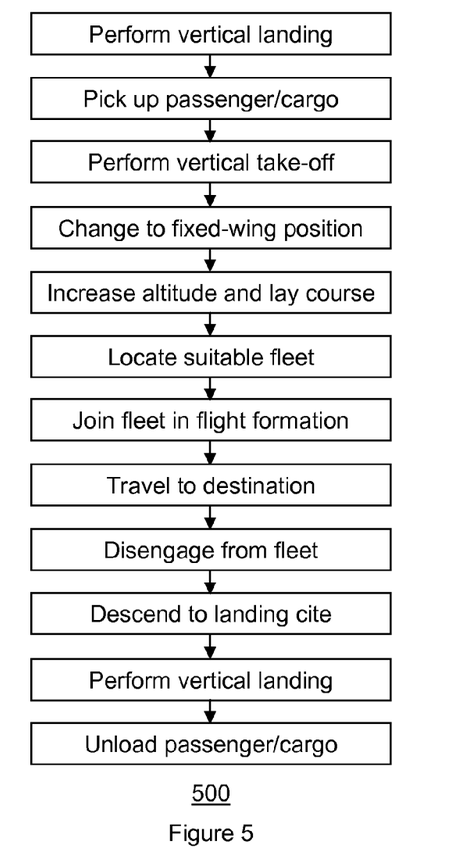
FIG. 5 shows an exemplary method for providing distributed airborne transportation services in accordance with at least some embodiments of the present invention.

In accordance with another embodiment of the present invention, FIG. 5 shows an exemplary method 500 for providing distributed airborne transportation services. The method 500 includes the following: (1) perform vertical landing, (2) pick up passengers and/or cargo, (3) perform vertical take-off, (4) transform to fixed-wing position, (5) increase altitude and lay out course, (6) locate suitable fleet, (7) join a fleet in flight formation, (8) travel to destination, (9) disengage from the fleet, (10) descend to landing site, (11) perform vertical landing, and (12) unload passengers or cargo. Some of these, such as (5) increasing altitude and laying the course for the airborne vehicle, may be optional in various embodiments. Alternatively, additional actions may be added, such as loading and unloading of additional passengers and/or cargo.

The above method and embodiments similar to this method, in general, may be subdivided into three method categories: (1) loading methods, (2) travel methods and (3) unloading methods. Loading and unloading methods may differ depending on whether the service is intended for passengers, cargo, or combinations thereof. For example, additional equipment and automated loading procedures may be implemented for loading and unloading cargo. Also, cargo may be loaded and unloaded even without the VTOL transport vehicle actually touching the ground, e.g., using air-to-air transfer between airborne vehicles or via the use of cables and parachutes.

Figure 6:
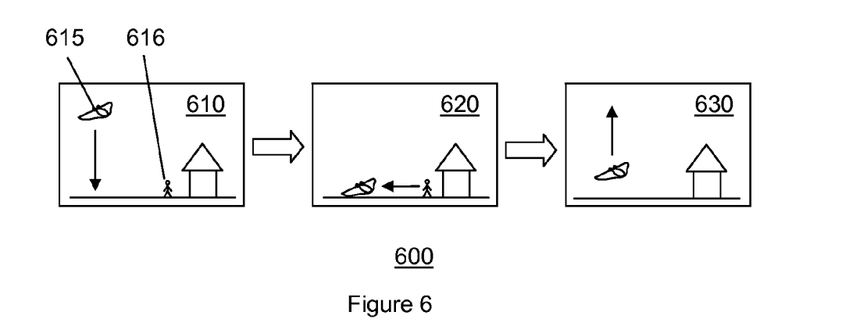
FIG. 6 shows schematically an example of a loading method in accordance with at least some embodiments of the present invention.

In accordance with some aspects of the present invention, FIG. 6 shows schematically an example of a loading method 600, which may be used, for example, in combination with the method 500 disclosed above. In some embodiments, the method 600 includes: performing a vertical landing of a vehicle 615 (shown by 610), loading a passenger 616 (shown by 620), and performing a vertical take-off by vehicle 615 with passenger 616 on board (shown by 630). Furthermore, the method 600 may further include a vertical ascent, in which the speed of the vehicle is substantially vertical and the lateral speed component is smaller than the vertical speed component. Of course, the same method may be applied to loading of multiple passengers at the same location and/or loading of cargo. Alternatively, the process described by method 600 may be repeated at different sites and locations, so that different passengers and cargo or types of cargo may be loaded onto the same vehicle 615 (with or without complete or partial unloading of any existing passengers or cargo).

Figure 7:
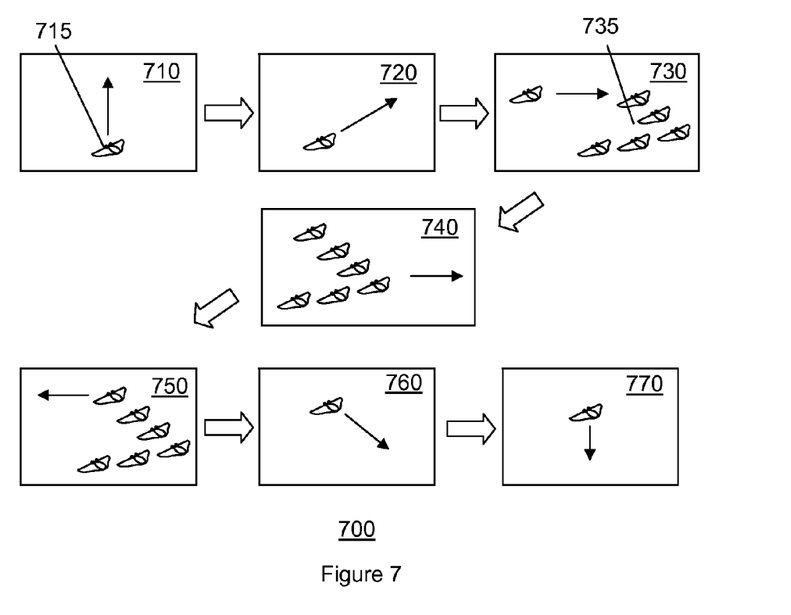
FIG. 7 shows schematically an example of a travel method in accordance with at least some embodiments of the present invention.

In accordance with another aspect of the present invention, FIG. 7 shows schematically an example of a travel method 700, which may be used, for example, in combination with the method 500 disclosed above. In some embodiments, the method 700 includes: increasing altitude of vehicle 715 using its VTOL capabilities (shown by 710), transforming vehicle 715 to a fixed-wing position and increasing its lateral velocity (shown by 720), locating a suitable fleet of airborne vehicles (fleet 735) and joining fleet 735 in flight formation (shown by 730), travelling towards a destination with fleet 735 (shown by 740), disengaging from fleet 735 (shown by 750), descending towards a landing site and transitioning to a vertical landing position (shown by 760), and reducing the altitude of vehicle 715 using its VTOL capabilities (shown by 770). Instead of joining an existing fleet, vehicle 715 may also join another airborne vehicle (similar or dissimilar) and thereby forming a two-vehicle fleet.

Figure 10:
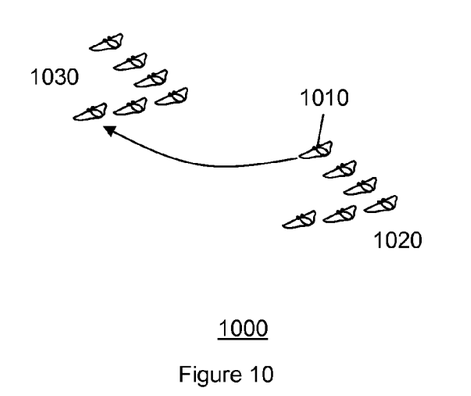
FIG. 10 shows schematically an example of a portion of a travel method in accordance with at least some embodiments of the present invention.

Of course, some of the above may be optional and omitted, or alternatively additional actions may be introduced. For example, vehicle 715 may communicate with fleet 735 before and/or after joining the fleet. Also, the vehicle 715 may travel for substantial distances without an accompanying fleet. Furthermore, some actions may be repeated. For example, vehicle 1010 may switch between different fleets 1020 and 1030, as shown by 1000 in FIG. 10, in which a part of its course may be travelled with one suitable fleet (e.g., 1020) and another part of the course may travelled with a different, preferably more suitable, fleet (e.g., 1030). The different fleet may be more suitable by providing one or more of a different flight path, a different destination, a more efficient flight formation, or the like. Alternatively or in combination, the method 700 may include changing the position of vehicle 715 within fleet 735. In some embodiments, the method 700 may include refueling and recharging of an airborne vehicle by another airborne vehicle (optionally within the same fleet), in which fuel and/or electrical energy respectively are exchanged between the two vehicles with assistance of a transfer line or a cable. Any travel method may also include optional actions related to emergency situations, in which a vehicle performs one or more actions necessary for communicating with a fleet and/or flight control authorities, quick disengagement from a fleet, rapid decent, or the like.

Figure 8:
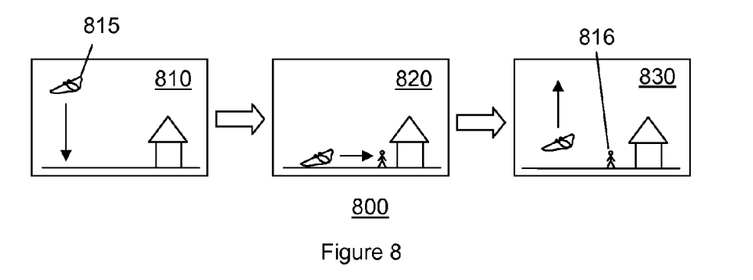
FIG. 8 shows schematically an example of a loading method in accordance with at least some embodiments of the present invention.

In accordance with yet another aspect of the present invention, FIG. 8 shows schematically an example of an unloading method 800, which may be used, for example, in combination with the method 500 disclosed above. In some embodiments, the method 800 includes: performing a vertical landing of a vehicle 815 (as shown by 810), unloading a passenger 816 (as shown by 820), and performing a vertical take-off by vehicle 815 (as shown by 830). Furthermore, the method 800 may include a vertical descent before landing, in which the speed of the vehicle is substantially vertical. Of course, the same method may be applied to unloading of multiple passengers at the same location and/or unloading of cargo. Alternatively, the process described by method 800 may be repeated at different sites and locations, so that different passengers and cargo or types of cargo may be unloaded onto the same vehicle 815. Furthermore, both loading and unloading methods include landing on suitable surfaces such as ground surfaces, roof surfaces (especially flat roofs), flight decks of large building and vehicles, floating decks on water surfaces, water surfaces (with appropriate landing gear), road surfaces, off-road surfaces, and so on.

In accordance with embodiments of this invention, loading, unloading, and travel methods described above may be modified, shortened, expanded, and combined with each other to produce different sequences of procedures for airborne transportation services. For example, loading methods may be combined with unloading methods, so that the same airborne vehicle may be used for loading and unloading passengers/cargo at the same location at the same time. In another example, the same airborne vehicle may be used for loading and/or unloading passengers/cargo at the same location at the same time while one or more passengers and/or cargo remains on the plane to continue to a subsequent destination.

Figure 9:
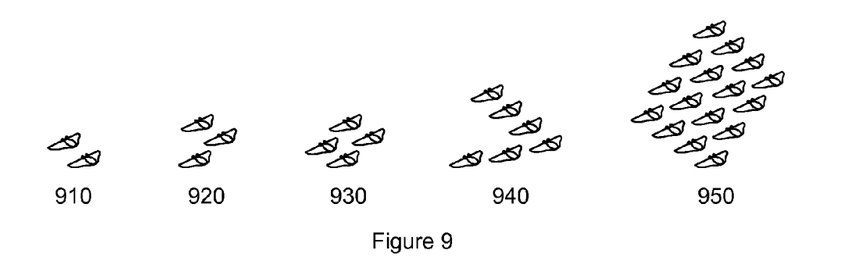
FIG. 9 shows examples of several fleet configurations in accordance with at least some embodiments of the present invention.

In accordance with another embodiment of this invention, different fleet configurations may be used in the travel methods described above. FIG. 9 shows examples of several fleet configurations 910-950, which differ from each other in size, shape, and number of members. At least one of the driving factors for a fleet formation is the optimization of energy consumption by each vehicle within the fleet. By flying next to each other, vehicles in a fleet as whole reduce the power necessary for their propulsion and level flight. Generally, the power reduction is larger in a larger fleet. Thus, the fleet is able to perform level flight on net propulsion power that is less than sum of propulsion powers of all its airborne vehicles flown separately. The inter-vehicle separation within the fleet should be less than 100 wing spans of typical member vehicle and generally may vary from tens to a fraction of the characteristic wing-span of its members. In order to minimize the size of the fleet and maximize its efficiency, the separation between neighboring airborne vehicles may be preferable to be less than 10 wing spans. It is also preferable that lateral separation (along the wing span) between airborne vehicles is substantially smaller than the longitudinal separation (along the flight path). The altitude of the airborne vehicles in flight formation may be substantially the same. The difference in altitude may be governed by the requirement to retain the aerodynamic drag reduction in flight formation and typically is a fraction of the wing span of the airborne vehicle.

As a result, fleets may form complex two-dimensional and three-dimensional patterns. Aircraft within a single fleet may change their positions with respect to each other, in order to optimize their power consumption, change fleet configuration and respond to environmental changes. Due to this complexity, autonomously piloted vehicles (APV) may be better at formation flying in comparison to manually piloted aircraft. Auto-piloting software on board of APVs may be further specialized for formation flying. Additional APV capabilities that simplify formation flying may include direct communication channels between different APVs within a fleet, local area networking capabilities for data exchange within a fleet (e.g. ad hoc networking), sensors and beacons for automatic collision avoidance, etc.

Figure 11:
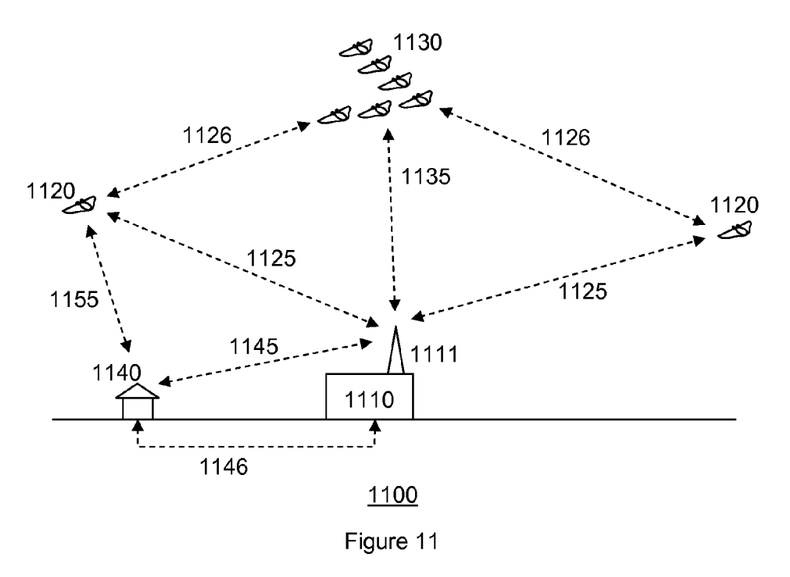
FIG. 11 shows a distributed transportation system in accordance with at least some embodiments of the present invention.

The fleets described above may have at least two ways to organize themselves into a stable formation. One way is via a centralized control from a single command source following procedures and patterns formulated in advance. The other way is via a distributed (ad hoc) control mechanism, in which each airborne vehicle determines its position within its fleet autonomously, and with the assistance from other vehicles from the same fleet only if necessary. The latter approach of a self-organizing airborne fleet is particularly attractive and should be a preferred way, since it is faster, safer, more economical, responsive, adaptive, and scalable In accordance with another embodiment of this invention, FIG. 11 shows a distributed transportation system 1100, which includes a control center 1110, individual airborne vehicles 1120, and fleet of airborne vehicles 1130. The control center and each vehicle are equipped with means for wireless communications (e.g., 1111 in FIG. 11), such as RF antennas, transmitters, and receivers. Alternatively, this means may include free space optical communications equipment. As a result, the system 1100 is configured to have bi-directional wireless links between its components (i.e., ground based stations and airborne assets) for exchange of flight control signals, telemetry data, navigational signaling, and so on. For example, FIG. 11 shows wireless links 1125 between the control center 1110 and the individual airborne vehicles 1120 and wireless links 1135 between the control center 1110 and the fleet of airborne vehicles 1130, as well as direct wireless links 1126 between individual airborne vehicles 1120. In addition, system 1100 is provided with communication links to customers and/or their premises 1140, including wireless links 1145 and wired links 1146, for the purposes of receiving customer orders, tracking their location, updating their status, exchanging relevant information and so on. Furthermore, a direct communication link 1155 between an airborne vehicle 1120 and customers/premises can be established for faster and more accurate exchange of information. Thus, as shown in FIG. 11, one or more communication links can be established with an airborne vehicle to provide one or more of customer information, navigational data, or flight data from other airborne vehicles to the airborne vehicle.

Furthermore, the system 1100 may be expanded to include other elements. For example, it may comprise multiple fleets of various sizes that are able to dynamically vary in size and complexity. It may include additional ground-based facilities, such as additional control centers, maintenance centers, heliports, communication towers and so on. It may include parking areas for vehicles on stand-by, waiting for passengers. It may also include sea-based facilities, such as aircraft carriers, sea-based control centers (for example, located on boats and sea vessels), and aircraft suitable for landing on water. Furthermore, it may include space-based facilities, such as satellites for establishing additional communication links between control centers, airborne vehicles and customers.

Figure 12:
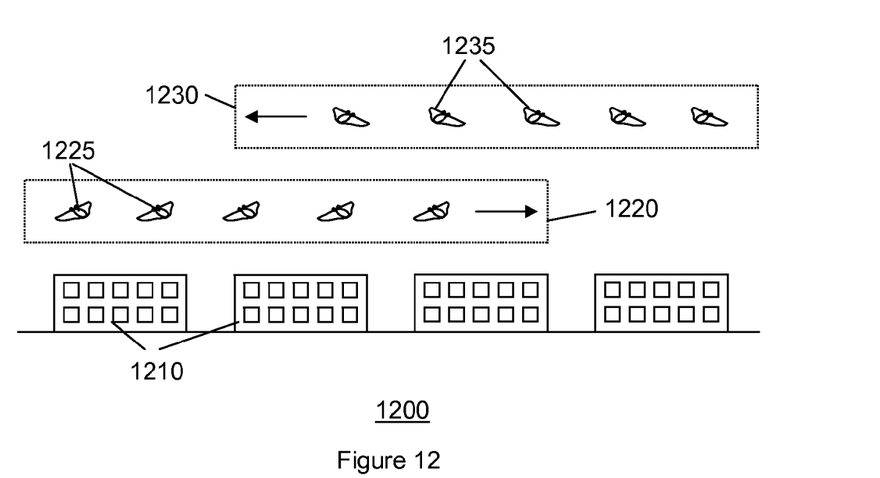
FIG. 12 shows a distributed transportation system in accordance with at least some embodiments of the present invention.

In accordance with another embodiment of this invention, FIG. 12 shows a distributed transportation system 1200, in which flight formation is used for organizing airborne transportation in the urban area. In this case an area on the ground may be densely populated with people and buildings 1210. Such an area may be heavily trafficked both on the ground and in the air. Formation flying may a useful tool under such conditions for organizing flight patterns of and ensuring safety of multiple small-scale aircraft of the type described in the above, even for short range travels within the same metropolitan area. In this case, minimizing fleet power consumption is unimportant or less important, and different flight formations are therefore possible. For example, FIG. 12 shows two fleets 1220 and 1230, each comprised of multiple airborne vehicle 1225 and 1235 in a straight line. These fleets are able to fly in formation in different directions without collision and interference from each other.

Figure 13:
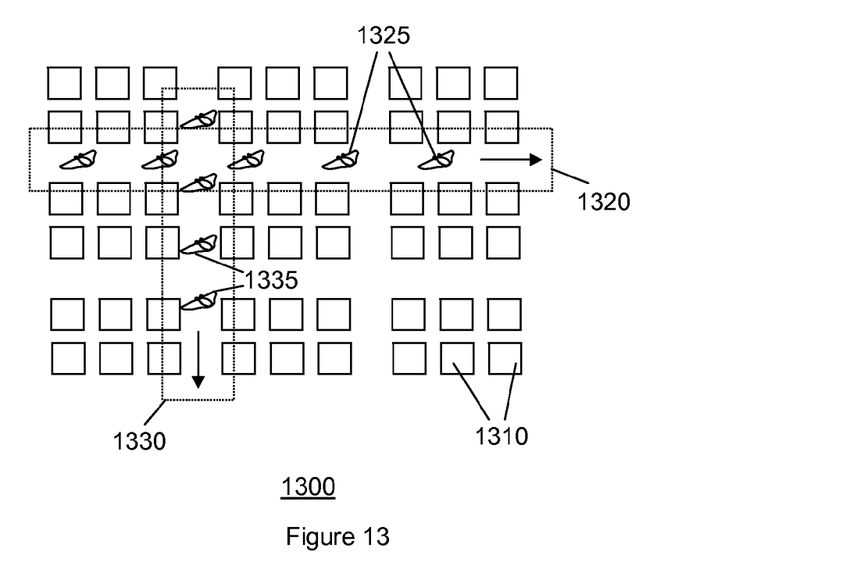
FIG. 13 shows a top view of a distributed transportation system in accordance with at least some embodiments of the present invention.

Similarly, FIG. 13 shows a top view of a distributed transportation system 1300 in an urban area populated with buildings 1310. The system 1300 includes two fleets 1320 and 1330, each comprised of multiple aircraft 1325 and 1335 in flight formation. The aircraft in the same formation maintain the same speed, heading, altitude and separation between neighboring aircraft. Flight routes for such fleets may be predefined in advance and programmed in with GPS (Global Positioning System) markers in the flight control software. Therefore, the two fleets at different altitudes may cross each other paths without interference as illustrated in FIG. 13. Typical separation between different aircraft in urban flight formation may range from 1 to 10 wing spans of a single airborne vehicle, but in general cases may exceed this range. Urban areas also provide additional options for take-off and landing, such as roofs of the buildings. VTOL vehicles may use flat roofs as convenient and safer alternative for loading and unloading of passengers and cargo.

Although various methods and apparatus are described above in particular exemplary embodiments, variations and combinations of the methods and apparatus are contemplated. For example the disclosed methods may be performed in connection with any of the disclosed systems and airborne vehicles, as well as with other alternative systems and vehicles. In addition, various modifications of the methods, such as omitting optional processes or adding additional processes may be performed.

For example, in some embodiments, a method for distributed airborne transportation may include providing an airborne vehicle with a wing and a wing span, having capacity to carry one or more of passengers or cargo (e.g., any of the airborne vehicles disclosed above). The airborne vehicle may be landed near one or more of passengers or cargo and the at least one of passengers or cargo loaded into the airborne vehicle. Next, the airborne vehicle takes-off and a flight direction for the airborne vehicle is determined. At least one other airborne vehicle having substantially the same flight direction is located. The airborne vehicle then joins at least one other airborne vehicle in flight formation to form a fleet, in which airborne vehicles fly with the same speed and direction and in which adjacent airborne vehicles are separated by distance of less than 100 wing spans.

In another example, a method for distributed airborne transportation within an area on the ground may be provided by providing an airborne vehicle with a wing and a wing span, having capacity to carry at least one of passengers or cargo (e.g., any of the airborne vehicles disclosed above). Non-intersecting flight routes in the area are determined and defined. The airborne vehicle is landed and at least one of passengers or cargo is loaded into the airborne vehicle. The airborne vehicle then takes-off and an appropriate flight route for the airborne vehicle is selected. The airborne vehicle then merges into the flight route.

In another example, a distributed airborne transportation system includes a plurality of airborne vehicles, each having a wing and vertical take-off and landing capabilities (e.g., any of the airborne vehicles disclosed above). An airborne fleet is defined comprising at least two of the plurality of airborne vehicles flown in flight formation (e.g., as described in any of the embodiments disclosed herein). The separation between the airborne vehicles within the fleet is less than the average wingspan of the plurality of airborne vehicles in the airborne fleet. A flight control center (e.g., 1110) is provided with established wireless communication links between the flight control center and the plurality of airborne vehicles.

While the foregoing is directed to embodiments of the present invention, other and further embodiments of the invention may be devised without departing from the basic scope thereof.

The invention claimed is:

1. A method for distributed airborne transportation, comprising:
   providing an airborne vehicle with a wing and a wing span, having capacity to carry one or more of passengers or cargo;
   landing of the airborne vehicle near one or more of passengers or cargo and loading at least one of passengers or cargo;
   taking-off and determining a flight direction for the airborne vehicle;
   locating at least one other airborne vehicle, which has substantially the same flight direction as the determined flight direction;
   selecting, for joining, the at least one other airborne vehicle based on flight direction; and
   joining at least one other airborne vehicle in flight formation and forming a fleet, in which airborne vehicles fly with the same speed and direction and in which adjacent airborne vehicles are separated by distance of less than 100 wing spans.

2. The method of claim 1, further comprising traveling with the fleet and maintaining position of the airborne vehicle within the fleet.

3. The method of claim 1, further comprising leaving the fleet by changing one or more of the airborne vehicle's flight speed, direction, or altitude.

4. The method of claim 3, further comprising landing of the airborne vehicle and unloading one or more of passengers or cargo.

5. The method of claim 3, further comprising joining another fleet of airborne vehicles and forming another flight formation.

6. The method of claim 1, wherein the airborne vehicle has vertical take-off and landing capabilities.

7. The method of claim 6, further comprising vertical take-off and vertical ascent, in which the direction of the flight is substantially vertical.

8. The method of claim 6, further comprising transitioning from vertical flight to horizontal flight, in which the direction of the flight is substantially horizontal.

9. The method of claim 1, wherein the airborne vehicle has a foldable wing.

10. The method of claim 9, further comprising folding the foldable wing before landing.

11. The method of claim 10, wherein landing includes one of landing on the ground, a roof, a building, or a vehicle.

12. The method of claim 1, further comprising establishing a communication link to communicate with a customer.

13. The method of claim 12, wherein landing occurs near a location provided by the customer via the communication link with the customer.

14. The method of claim 1, wherein the fleet is able to perform level flight on net propulsion power that is less than a sum of propulsion powers of all its airborne vehicles flown separately.

15. The method of claim 1, further comprising establishing a communication link with the airborne vehicle and providing one or more of customer information, navigational data, or flight data from other airborne vehicles.

16. The method of claim 1, further comprising establishing a communication link between the airborne vehicle and at least one other airborne vehicle.

17. The method of claim 1, further comprising automatic piloting of the airborne vehicle using an onboard autopilot.

18. The method of claim 17, further comprising automatic sensing and positioning of the airborne vehicle within the fleet.

19. The method of claim 1, further comprising defining a flight route for the fleet.

20. The method of claim 19, further comprising finding a defined flight route in the vicinity of the airborne vehicle.

21. The method of claim 1, further comprising providing a control center and establishing a communication link between the airborne vehicle and the control center.

* * * * *